Aug. 22, 1950     O. A. STELTER     2,519,511
ANCHOR OR TOGGLE BOLT
Filed April 29, 1947
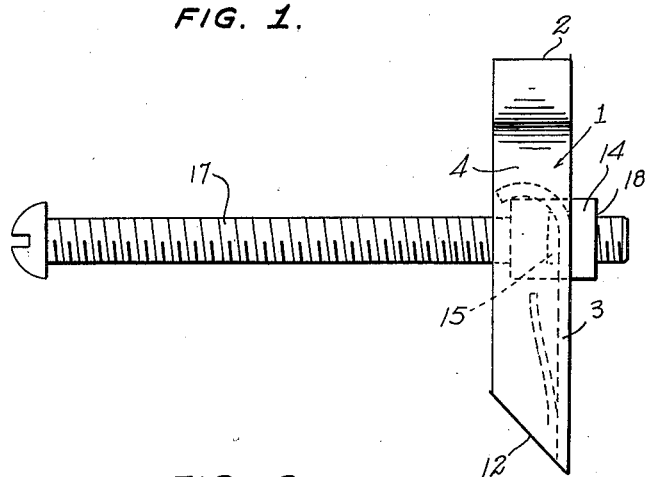
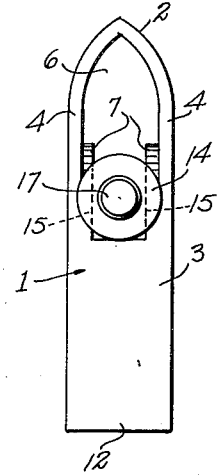
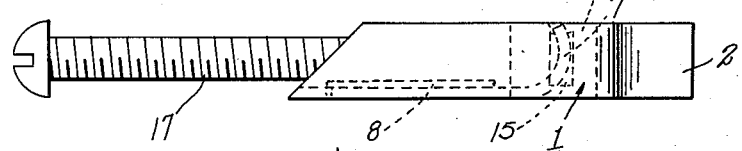
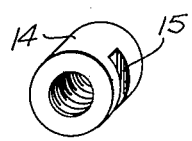
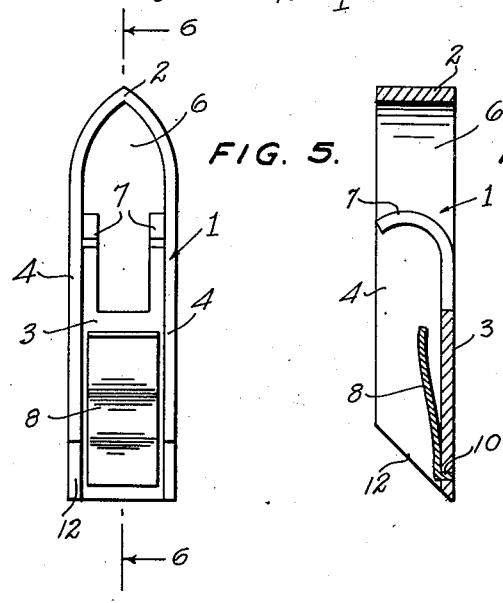
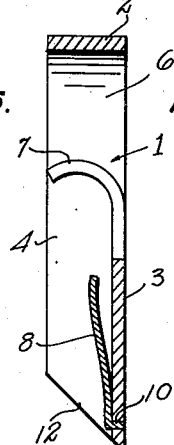
Inventor
OTTO A. STELTER,
By McMorrow, Berman & Davidson
Attorneys Patented Aug. 22, 1950

2,519,511

UNITED STATES PATENT OFFICE 2,519,511

ANCHOR OR TOGGLE BOLT

Otto A. Stelter, West Allis, Wis.

Application April 29, 1947, Serial No. 744,691

3 Claims. (Cl. 85—3)

This invention relates to anchor or toggle bolts, and more particularly to a securing device of the kind referred to adapted to be inserted through an opening in a wall or other structure, and having a head or anchoring member for engagement with the inner surface of the supporting structure to maintain the bolt securely in place.

The invention has for chief object the provision of a toggle bolt having a head or anchoring member shaped for convenient insertion through a hole in a wall or other supporting structure, and having no projections extending substantially beyond the sides of the anchoring member to interfere with the free passage of the bolt through the hole.

A further object is to provide a toggle bolt having means carried by the head or anchoring member to assist in positioning the same in engagement with the inner surface of the wall or other supporting structure when the bolt has been inserted through a hole therein, so that the anchoring member is moved into locking engagement with the inside of the supporting structure to permit the bolt to be tightened in place.

A still further object is the provision of a securing means of the character referred to having separable parts, each of which can be made as a separate item for assembly immediately prior to application.

Briefly stated, the invention comprises a toggle bolt structure having a head or anchoring member tapered for convenient insertion in a hole in a supporting structure, and having guides for the reception of a slotted nut for cooperation with a screw by which the device is tightened in position.

The full nature of the invention will best be understood from the following description constituting a specification of the same, when taken in conjunction with the annexed drawings, wherein:

Figure 1 is a side elevational view of the toggle bolt with the head or anchoring member of the same in the position which it occupies when the bolt has been inserted through a hole in the supporting structure and is in normal position for tightening in place;

Figure 2 is an end elevational view of the invention as seen from the right end of the same, as illustrated in Figure 1;

Figure 3 is a side elevational view of the toggle bolt with the parts arranged in proper position for inserting the head or anchoring member through a hole in the supporting structure;

Figure 4 is a perspective view of the slotted nut used with the toggle bolt;

Figure 5 is a front elevational view of the head or anchoring member of the toggle bolt, showing the details of construction of this member;

Figure 6 is a cross-sectional view taken along the line 6—6 of Figure 5, looking in the direction indicated by the arrows.

Referring to the drawings in greater detail, 1 indicates the head or U-shaped anchoring member of a toggle bolt, which is preferably formed in one piece from sheet metal of suitable thickness, and possessing the requisite characteristics of strength and durability for the purpose to which it is to be applied. The anchoring member is of generally channel shape, having a tapered end 2 for guiding the toggle bolt through a hole in the wall or other supporting structure to which the bolt is to be secured. The anchoring member may be formed with a back portion 3 joining the side portions 4 of the same, which back portion is preferably cut away in the vicinity of the tapering point where the sides of the anchoring member are joined together.

The opening 6 provided by the sides of the anchoring member may extend to approximately the mid-portion of the member, and bordering this opening at each side of the same curved guides 7 merge with the back portion or bight 3.

Within the lower portion of the anchoring member a flat spring 8 or similar device is positioned, for a purpose later to be made apparent. This spring 8 may be secured to the back portion 3 adjacent the lower end of the anchoring member by any suitable means, such as welding, insertion in a slot 10, or the like. The lower end of the anchoring member is open, as indicated at 12 and may be tapered, as indicated.

The slotted nut is provided for insertion within the anchoring member, and this nut, indicated by 14, may be of circular cross-section, as best seen in Figure 4. The nut has opposite transverse slots 15 positioned approximately mid-way of its length, which slots are somewhat wider than the thickness of the metal of which the anchoring member is formed. The nut 14 is so proportioned, and the slots 15 of the same are sufficiently wide to permit the nut to be inserted in the anchoring member by passing the slots over the guide flanges 7 and moving the same into the anchoring member, as best seen in Figure 3 of the drawings. In this position of the nut within the anchoring member, the bolt or screw member 17 of the toggle bolt can be threaded into the nut, and the same cannot thereafter be removed from the anchoring member without forcibly bending the curved guides 7. Furthermore, the nut 14 must be placed in the anchoring member before the screw 17 is inserted in the nut, otherwise the screw will not permit rotation of the nut to pass along the guides 7.

In applying the toggle bolt, the nut 14 is first inserted in the anchoring member 1 by engaging the slots 15 with the curved guides 7 and turning the nut into the anchoring member, as indicated in Figure 3. The screw 17 is then threaded into the nut and the anchoring member is held in alignment with the screw against the opposing pressure of the spring 8. In this condition of the device, the tapered end 2 of the anchoring member can be pushed through an opening of suitable size formed in a wall or other supporting structure, and due to the fact that there are no protrusions or other obstructing portions extending laterally from the anchoring member, the passage of the same through such a hole will take place with comparative ease.

As soon as the open end 12 of the anchoring member passes through the wall or other supporting structure, the spring 8 pressing against the screw 17 causes the anchoring member to be moved out of alignment with the screw into a position extending transversely of the same and in condition to be brought into close engagement with the inner surface of the wall or supporting structure. By this movement of the anchoring member, the nut 14 is moved further along the guides 7 to a position in which the grooves 15 are in engagement with portions of these guides extending longitudinally of the anchoring member, as is plainly indicated in Figure 1. The screw 17 can then be tightened against the object which is to be secured to the supporting structure, which results in bringing the anchoring member into closer engagement with the inner surface of the supporting structure, thus securely holding together the parts.

The various parts of the toggle bolt may, of course, be sold in separated condition, so that the operation of assembling the parts and packing the same in assembled condition can be dispensed with, thus effecting a substantial saving in manufacturing and marketing such devices.

The nut 14 may be of greater length than the depth of the anchoring member 1, so that the end 18 of the nut projects beyond the back portion 3 of the anchoring member when the toggle bolt has been applied to the supporting structure, as will be seen in Figure 1. Thus, a nut having increased threaded engagement with the screw 17 may be employed, which greatly enhances the strength and effectiveness of the toggle bolt.

It will thus be seen that the invention as described above provides a toggle bolt structure of simple design, capable of easy application, and certain in operation.

While the invention has been shown and described with reference to a particular embodiment of the same, it will be understood that many changes in the proportions and arrangement of the various parts can be made, such, for example, as forming the side portions 4 at the tapered end 2 of the anchoring member as two separate curved portions instead of joining the same, and such variations will not result in a departure from the spirit of the invention, or the scope of the appended claims.

Having thus clearly shown and described the invention, what is claimed as new and desired to secure by Letters Patent is:

1. A toggle link of the kind described comprising an anchor member including a pair of side walls, a back portion connecting said side walls at one end, confronting arcuate guide flanges on said side walls terminating at one end on the free edge of said side walls and engaging the back portion at the other end, and a cylindrical nut formed with transverse slots on the opposite sides thereof engageable on said guide flanges for sliding and rocking connection with said anchor member.

2. A toggle bolt of the kind described comprising a U-shaped anchor member, confronting arcuate guide flanges on the side walls of said anchor member terminating at one end on the free edge of said side walls and engaging the bight portion at the other end, and a cylindrical nut formed with transverse slots on the opposite sides thereof engageable on said guide flanges for sliding and rocking connection with said anchor member.

3. A toggle bolt of the kind described comprising a U-shaped anchor member, confronting arcuate guide flanges on the side walls of said anchor member terminating at one end on the free edge of said side walls and engaging the bight at the other end, a cylindrical nut formed with transverse slots on the opposite sides thereof engageable on said guide flanges for sliding and rocking connection with said anchor member, and a spring on the bight portion of said anchor member engageable with a bolt engaged in said nut for biasing the nut and bolts transversely of said channel member.

OTTO A. STELTER.

REFERENCES CITED

The following references are of record in the file of this patent:

UNITED STATES PATENTS

| Number | Name | Date |
|---|---|---|
| 557,361 | Church | Mar. 31, 1896 |
| 1,373,188 | Goewey | Mar. 29, 1921 |
| 2,258,342 | Tinnerman | Oct. 7, 1941 |